United States Patent [19]
Blackmon

[11] Patent Number: 5,134,650
[45] Date of Patent: Jul. 28, 1992

[54] DIAL INBOUND METER INTERFACE UNIT (MIU) FOR AUTOMATIC METER READING USING NO SUBSCRIBER LINE ACCESS CONTROLLER

[75] Inventor: James M. Blackmon, Duluth, Ga.

[73] Assignee: Schlumberger Industries, Inc., Norcross, Ga.

[21] Appl. No.: 644,173

[22] Filed: Jan. 22, 1991

[51] Int. Cl.$^5$ ............................................. H04M 11/00
[52] U.S. Cl. ..................................... 379/107; 379/104
[58] Field of Search ................. 379/106, 107, 102, 92, 379/104, 105

[56] References Cited

U.S. PATENT DOCUMENTS

| 4,660,218 | 4/1987 | Hashimoto | 379/102 |
| 4,720,851 | 1/1988 | Smith | 379/107 |
| 4,949,372 | 8/1990 | Steele | 379/106 |

Primary Examiner—James L. Dwyer
Assistant Examiner—Wing F. Chan
Attorney, Agent, or Firm—Sanford J. Asman

[57] ABSTRACT

The present invention is a method by which a dial inbound MIU is able to provide for connection with a central station computer without the need for any specialized telephone equipment at the telephone company's central office. If the customer's phone has been called, the invention detects whether the customer has answered. It then waits until the customer hangs up, and when the customer hangs up it siezes the line and waits for a modem tone indicative of the presence of the central station computer waiting to establish communication. If that modem tone is present, the MIU will connect to the central computer and permit communication to take place before releasing the phone line.

12 Claims, 3 Drawing Sheets

DIAL INBOUND METER INTERFACE UNIT (MIU) FOR AUTOMATIC METER READING USING NO SUBSCRIBER LINE ACCESS CONTROLLER

BACKGROUND OF THE INVENTION

The present invention relates to automatic equipment used for reading utility meters such as electric, gas, or water meters.

Many companies provide automatic meter reading equipment which is capable of reading meters on customer premises and transmitting such meter readings automatically to a central billing computer. Typical systems use both telephone and radio schemes for transmitting such metering readings to the central billing computer of the utility. The present invention relates to automatic meter reading equipment which uses a modem to communicate over a telephone line to a central billing computer located at the utility office. In particular, the invention relates to a so-called "dial inbound" meter interface unit (MIU) which interfaces one or more of a customer's on-site utility meters to a telephone line. In the past, there have been on-site metering reading equipment having modem capability which was capable of receiving telephone calls from a central utility billing computer through the use of special equipment located at the central office of the telephone company, and there have also been on-site meters with modems which were capable of transmitting telephone calls to a central billing computer.

DETAILED DESCRIPTION OF THE PREFERRED EMBODIMENT

In accordance with the present invention, a dial inbound meter may be called from a central billing computer without any special equipment at the telephone company's central office.

Figure 1:
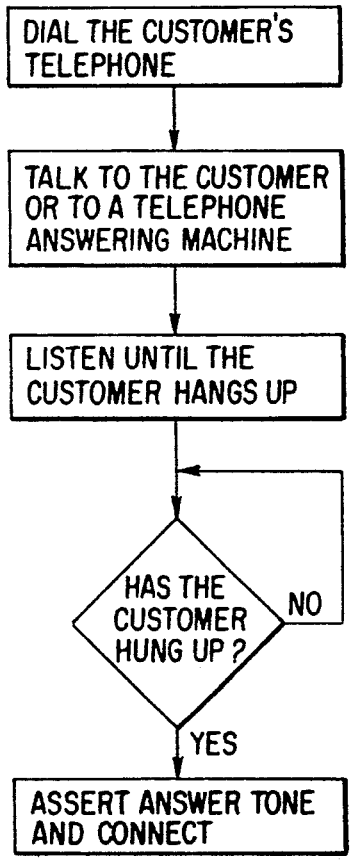
FIG. 1 is a flow chart illustrating the activities of the calling operator who places a call from the central station to the meter utilizing the current invention.

Referring generally to FIG. 1, a flow chart illustrating the operation of the dial inbound meter interface unit (MIU) of the present invention. With reference to FIG. 1, an operator in the utility's central office would initially dial the customer's telephone, i.e., the telephone to which the MIU of the present invention is connected. This telephone would be one which was already at the customer's location, i.e., one which the customer would normally use to make and receive telephone calls. Accordingly, either the telephone will be answered by a person, or it will be answered by an automatic answering machine, or it will not be answered. Assuming that the telephone is, in fact, answered by a person, the utility company operator would ask whether it was convenient for the utility's central computer to interrogate the MIU at that time. The utility operator can then conclude the conversation with the customer. As soon as the customer hangs up the telephone, but before the connection is actually broken, the utility operator causes a modem Answer tone to be sent to the modem in the MIU, thereby causing the MIU to maintain the connection and to communicate with the utility company's computer. In the event that the customer's telephone is answered by an automatic answering machine, the operator will wait until the machine hangs up, and then assert the modem Answer tone. Again, the MIU will retain the communication, and the central computer can communicate with the automatic metering equipment.

Figure 2:
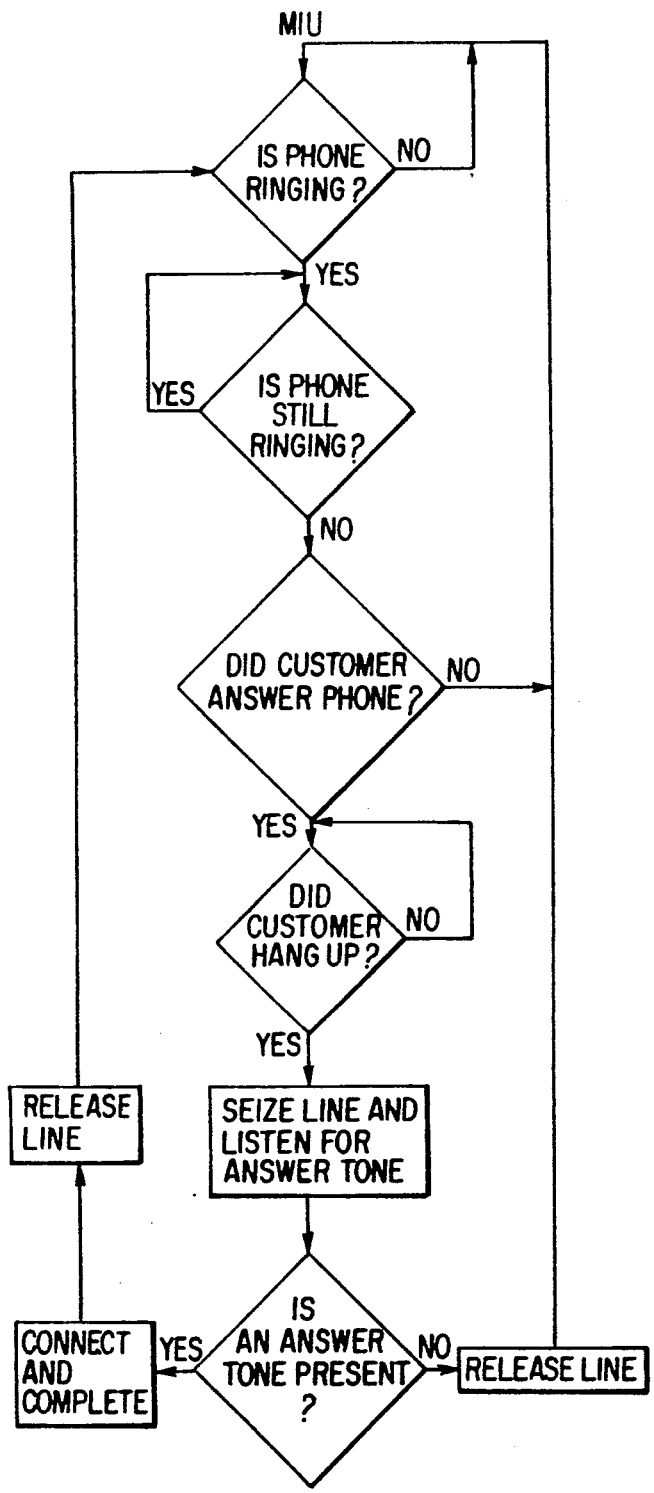
FIG. 2 is a flow chart of the operation of the MIU of the current invention.

Referring to FIG. 2, the operation of the MIU of the present invention is illustrated in a flow chart. Initially, the MIU is in a loop in which it remains until the customer's phone starts to ring. When the MIU's "ring detect" circuitry (to be explained hereafter) detects that the customer's telephone is ringing, it enters into a second loop in which it remains until the telephone stops ringing.

When the customer's phone is done ringing, the MIU's "off hook" circuitry determines whether the telephone is on-hook (i.e., the phone was not answered) or off-hook (i.e., the phone was answered). If the phone is on-hook, then the MIU's software returns to the original loop in which it waited for the phone to ring. Alternatively, if the phone is off-hook, the MIU knows that the telephone was answered, so it enters yet another loop in which it waits until the telephone has been hung up, i.e., the conversation has ended. Again, this is accomplished by the MIU's "off-hook detect" circuitry. As soon as the MIU detects that the customer (or answering machine) has hung up, it will sieze the phone line, i.e., it will prevent a disconnect from taking place, and it will wait for a Modem Answer tone. In the preferred embodiment of the invention, if no modem Answer tone is present within about four seconds, the MIU will assume that the telephone call was not initiated for the purpose of connecting the automatic metering equipment to the central computer. Accordingly, the MIU will release the telephone line, and it will return to the first loop in which it waits for the telephone to ring. Alternatively, if the modem Answer tone is present within the allotted time period, the MIU will connect the phone line to the modem of the automatic metering equipment, thereby completing the connection to the utility's central billing computer. Upon the completion of that connection, the MIU will release the telephone line, and it will return to its initial state of waiting for the telephone to ring.

Figure 3:
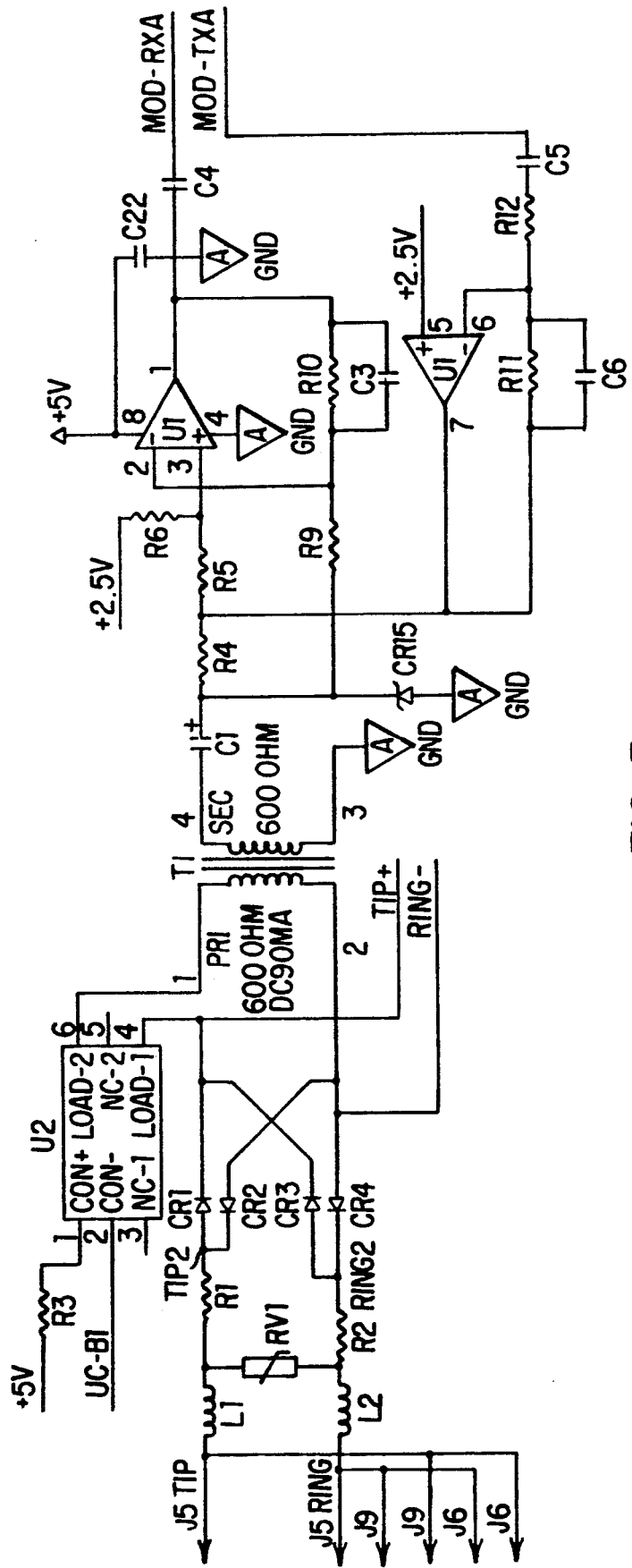
FIG. 3 is a schematic diagram of the portion of the MIU which contains the ring detect and off-hook detect circuitry.
Figure 3:
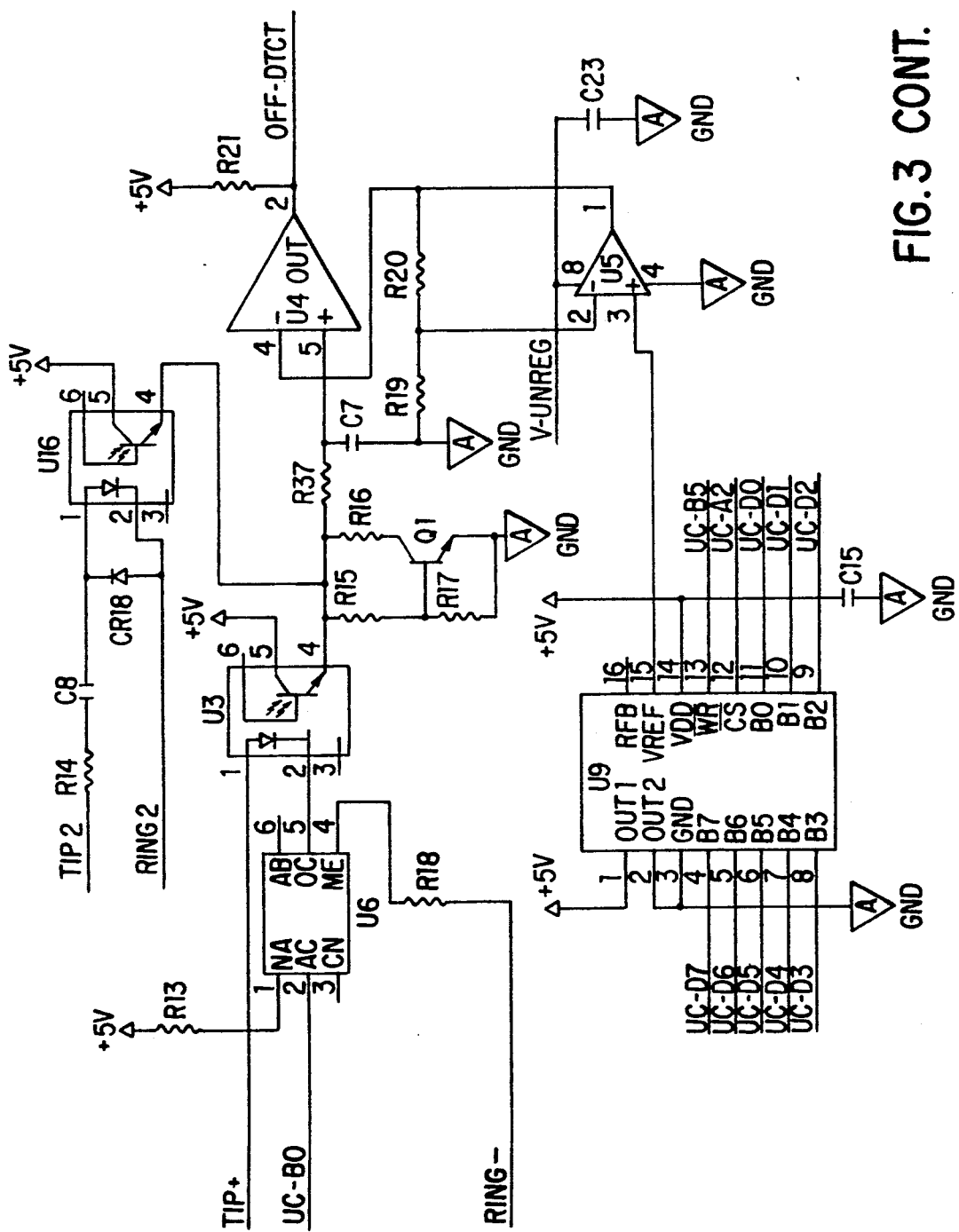

Referring now to FIG. 3, a schematic diagram of that portion of the MIU which contains the "ring detect" and "off-hook detect" circuitry is shown. With reference to FIG. 3, the incoming telephone lines are referenced as TIP and RING. These lines are connected through resistors, R1 and R2, respectively, to lines denoted as TIP2 and RING2, respectively. A full-wave rectifying bridge made up of diodes, CR1-CR4, is used to provide outputs on lines TIP+ and RING−, which have known polarity.

In order to provide isolation from the telephone lines, as is required to prevent interference with the telephone system, a transformer, T1, is use to connect the telephone lines through isolating amplifiers to modem transmit and receive lines, denoted MOD-TXA and MOD-RXA, respectively.

The purpose of the "off-hook detect" circuit is to be able to determine whether the phone line is available, i.e., on-hook, and also to determine whether the customer has picked up a phone while the MIU is on the line. In addition, if the customer is on the line, this circuit is used to determine when the customer hangs up. It is necessary to determine whether the customer has picked up a phone while the MIU is on the line in order to enable the MIU to relinquish the line to the customer. It is necessary to determine when a customer hangs up in order to accomplish the method of the present invention, i.e., to retain control of the line after the customer has hung up for communication with the central station.

The "off-hook detect" circuit is provided by an optoisolator U3 which is connected to TIP+ and, through optoisolator U6, to RING−. U6 is used as a switch to enable or disable the off-hook detect circuit. In particular, U6 is enabled by pulling line UC-B0 low which causes current to flow through the diode of optoisolator U6, thus turning on the phototransistor within U6 and enabling current to flow through the diode in optoisolator U3. Accordingly, when U6 has been enabled, the diode portion of U3 is effectively connected across the phone line, i.e., between TIP+ and RING−. At that time, the output of the phototransistor portion of optoisolator U3 will be a voltage proportional to the current flowing through the diode portion of U3 which is proportional to the voltage between TIP+ and RING−. The output of U3 is connected to one input of comparator U4 and through a non-linear "resistor" (comprised of R15, R16, R17, and Q1) to ground.

The other input of comparator U4 is connected to the output of a digital-to-analog (D/A) converter comprised of operational amplifier U5 and D/A converter U9. The reason for using both U5 and U9 is that the maximum output voltage of D/A converter U9 (in the single power supply mode) is one-half the power supply voltage, i.e., 2.5 volts. As a maximum output of 5 volts is required at the output of the D/A converter (in order to maintain the maximum resolution available at the output of optoisolator U3), operational amplifier U5 is used to provide an N-to-1 amplification function (where N is based upon the relative values of resistors R19 and R20). In the preferred embodiment of the invention, N is on the order of 2. Thus, the maximum output of the D/A converter comprising D/A converter U9 and operational amplifier U5 is 5 volts.

The voltage across TIP+ and RING− is nominally about 48 volts when the telephone is on-hook. However, while 48 volts, plus or minus 15%, is a nominal value, the actual values which may be encountered can be much greater than the nominal values. While the present circuit was designed to operate on voltages significantly greater than or less than the nominal values set forth above, the following explanation will assume that the nominal values are present.

Assuming that the customer's telephone is on-hook, a voltage difference of 48 volts will be present between TIP+ and RING−. If the MIU or the customer pick up the phone, the nominal value between TIP+ and RING− will go to about 8 volts (although this can also vary greatly). If the MIU has picked up the phone, and the customer then picks up the phone, the nominal value between TIP+ and RING− will go from 8 volts to about 4.36 volts assuming equal impedance for the MIU and the customer's phone. This occurs because the MIU and the customer's phone are connected in parallel across the phone line. Obviously, then, if additional telephone extensions are picked up, the voltage would drop even further.

Given that the MIU knows how the voltage between TIP+ and RING− will be affected, the manner of operation of the off-hook detect circuit can be explained further. In particular, the off-hook detect circuit must be able to detect both the large drop (between 48 volts nominal and 8 volts nominal) as well as the much smaller drop (between 8 volts and 4.36 volts). In addition, as will be understood by those skilled in the art, the MIU must also be able to respond to non-nominal situations.

In order to provide reliability and to avoid interference with the phone line, it is desireable to keep as little circuitry as possible attached to the telephone line. Also, it is desireable to optically isolate the circuitry which must be connected to the phone line. Consequently, optoisolators U3, U6, and U16 are used. Due to the non-linear current transfer ratios of optoisolators, only a relative measurement of the phone line voltage can be obtained at the output of the optoisolators.

In order, therefore, to be able to distinguish between such differences as on-hook and off-hook (i.e., large voltage differences), on the one hand, and the customer picking up the phone while the MIU is on the line (i.e., small voltage differences) on the other hand, all with the knowledge that individual phone lines often differ greatly from the nominal values, the D/A converter described above, is used in an analog-to-digital (A/D) converter, including the comparator U4, which makes use of the microprocessor in the MIU to detect the level of the signal into the comparator U4, and to detect changes in that input signal.

Without going into greater detail than necessary, it is possible to obtain one of 256 voltage levels (between 0 and 2.5 volts) at the output of D/A converter U9 in eight steps. As operational amplifier U5 provides a 2-to-1 amplification, the output of U5 (which goes to the negative input of comparator U4) can be varied from 0 to 5 volts in eight steps. By detecting when the output of comparator U4 changes, it can be determined when the output of amplifier U5 (the negative input to comparator U4) has changed relative to the positive input of comparator U4. Since the data lines of D/A converter U9 are controlled by the MIU's microprocessor, and since the output of U4 is used as an interrupt to the MIU's microprocessor, it is possible to determine the voltage level at the positive input to comparator U4. The use of the non-linear resistor comprised of R15-R17 and Q1 helps to expand the range of the voltage levels present when the telephone is off-hook.

In operation, the MIU's microprocessor steps through the inputs to U9 so as to provide increasing signal levels to amplifier U5. The output of amplifier U5 is an input to comparator U4, whose other input is the output of optoisolator U3. Consequently, an "off-hook" signal will be provided at the output of comparator U4, when U4 detects that the signal level from the optoisolator has dropped sufficiently to indicate that the telephone has been picked up, i.e, is off-hook. This off-hook signal is shown as OFF-DTCT in FIG. 3.

Similarly, the ring detect circuit makes use of optoisolator U16, which is capacitively coupled to TIP2 and RING2 to provide a voltage at the positive input to comparator U4 when the phone is ringing. As will be recognized by those skilled in the art, the ringing of the telephone is accomplished by imposing an alternating current signal of about 100 volts (RMS) at about twenty Hertz across TIP and RING.

The line siezure, described above with reference to FIG. 2, is accomplished through the use of solid state relay U2, shown in FIG. 3.

Based upon the foregoing explanations of the "ring detect" and the "off-hook detect" circuitry, and the use of solid state relay U2, one of ordinary skill in the art can readily understand how the MIU's actions, as set forth in FIG. 2 are accomplished through the use of the software controlling the microprocessor in the MIU.

In particular, the determination of whether or not the phone is ringing is accomplished through the use of the ring detect circuit. When the interrupt line, OFF-DTCT goes high, the microprocessor is interrupted. Assuming that the OFF-DTCT line went high because the phone was ringing, the OFF-DTCT line is then monitored to determine when the phone stops ringing by timing the interval between pulses (which correspond to rings) on the OFF-DTCT line. When the pulses stop, which is indicative of the ringing having stopped, and which may be determined by the absence of a pulse within five seconds of the last pulse, the off-hook detect circuit is enabled to determine if the phone line is off-hook or on-hook.

If the phone is on-hook, then the calling party hung up before the phone was answered, so the MIU will return to its initial state as shown in FIG. 2. Alternatively, if the phone line is off-hook, then the customer has answered, and the MIU will enable the OFF-DTCT line by adjusting the D/A converter's output level to a value somewhat under full scale level, so that when the customer hangs up, the OFF-DTCT line will go high, thus interrupting the microprocessor. Upon the occurrence of that interrupt, i.e., when the customer hangs up, the MIU will wait about one-half second (to allow for such things as "call waiting"), and then it will seize the line by turning on solid state relay U2. Those of ordinary skill in the art will recognize that when the phone is hung up, the telephone company switching circuitry (in the phone company's central office) will not actually disconnect the line for at least about one second.

The MIU will now wait for a modem Answer tone. If an Answer tone is heard within about four seconds, then the MIU will know that the central station is on line, and it will connect to the modem at the central station, thereby permitting any meter attached to the MIU to communicate with the central station. Upon the completion of such communication, the MIU will release the line by disabling the solid state relay U2, and it will return to its initial state, as shown in FIG. 2.

If no modem Answer tone is heard within about four seconds, then the MIU will immediately release the phone line and return to its initial state, as shown in FIG. 2.

The foregoing explanation is intended to illustrate how the present invention is able to communicate with the central station initiating the communication, even if the customer answers the telephone. Those of ordinary skill in the art will recognize that the present invention may be used in a dial inbound MIU, which will normally initiate calls to the central station, but which the central station may have need to call, from time to time.

Those of ordinary skill in the art will recognize that various changes can be made to the invention as described without departing from the spirit or scope of the present invention. For example, while the preferred embodiment of the invention has been explained with the assumption that the Answer tone is always coming from the central station, that is not necessary to the invention. Similarly, other items could be changed without departing from the inventive concept which has been described. In addition, it will be understood that the MIU which includes the present invention will still be able to function in a manner equivalent to dial inbound MIUs of the prior art, i.e., it can be scheduled to periodically call the central station.

Also, various features, unimportant to an explanation of the present invention can be present in an MIU including the present invention. Thus, the software in the preferred embodiment will continuously monitor the off-hook detect circuit while the MIU is communicating with the central station, so that if the customer picks up an extension, the MIU can relinquish the line.

I claim:

1. A method of providing a meter interface unit (MIU) which may be called from a central station without any special equipment in the telephone central office, said method comprising the steps of:
   (a) monitoring a telephone line until a ring signal is detected;
   (b) waiting until the telephone stops ringing;
   (c) determining whether the telephone is on-hook or off-hook when the telephone stops ringing;
   (d) waiting until the telephone has been hung up if it was off-hook in step (c);
   (e) detecting that the phone line has been hung up;
   (f) seizing the phone line to prevent a disconnect from taking place;
   (g) waiting a predetermined period of time for a signal indicative of an attempt to communicate with the MIU; and
   (h) connecting the MIU to the central computer if a signal indicative of an attempt to communicate with the MIU is present within said predetermined period of time, and releasing the telephone line if said signal is not present within said predetermined period of time.

2. The method of claim 1 wherein said step of monitoring a telephone line until a ring signal is detected is accomplished by detecting the presence of an alternating current on the telephone line.

3. The method of claim 2 wherein said step of monitoring a telephone line until a ring signal is detected is accomplished by using a programmed microprocessor which has a ring detect circuit which causes an interrupt line to go high when ringing occurs.

4. The method of claim 3 wherein said step of waiting until the telephone stops ringing is accomplished by monitoring said interrupt line to determine if it goes high at a time consistent with the ringing of a telephone.

5. The method of claim 4 wherein said step of determining whether the telephone is on-hook or off-hook when the telephone stops ringing is accomplished by monitoring the voltage across the telephone line to determine whether it has a magnitude consistent with a phone being off-hook.

6. The method of claim 5 wherein said step of waiting until the telephone has been hung up it was previously off-hook and said step of detecting that the phone line has been hung up are accomplished by monitoring the voltage across the telephone line to determine when its magnitude increases consistent with it having been placed on-hook.

7. The method of claim 7 wherein said step of siezing the phone line to prevent a disconnect from taking place is accomplished by enabling a relay when it has been determined that the phone line has been placed on-hook, but before the actual disconnect takes place at the telephone company's central office.

8. An improved meter interface unit (MIU) which may be called from a central station without any special equipment in the telephone central office, said MIU comprising:
   (a) means for monitoring a telephone line until a ring signal is detected and then waiting until the telephone stops ringing;
   (b) means for determining whether the telephone is on-hook or off-hook when the telephone stops ringing and waiting until the telephone has been hung up if it was off-hook;
   (c) means detecting that the phone line has been hung up;
   (d) means for seizing the phone line to prevent a disconnect from taking place and waiting a predetermined period of time for a signal indicative of an attempt to communicate with the MIU; and
   (e) means for connecting the MIU to the central computer, if a signal indicative of an attempt to communicate with the MIU is present within said predetermined period of time, and for releasing the telephone line if said signal is not present within said predetermined period of time.

9. The MIU of claim 8 wherein said means for monitoring said telephone line until a ring signal is detected detects the presence of an alternating current on the telephone line.

10. The MIU of claim 9 wherein said means for monitoring a telephone line until a ring signal is detected uses a programmed microprocessor which has a ring detect circuit which causes an interrupt line to go high when ringing occurs.

11. The MIU of claim 10 wherein said means for determining whether the telephone is on-hook or off-hook when the telephone stops ringing monitors the voltage across the telephone line to determine whether it has a magnitude consistent with a phone being off-hook.

12. The MIU of claim 11 wherein said means for siezing the phone line to prevent a disconnect from taking place is accomplished by enabling a relay when it has been determined that the phone line has been placed on-hook, but before the actual disconnect takes place at the telephone company's central office.

* * * * *